United States Patent
Yu et al.

(10) Patent No.: US 10,020,696 B2
(45) Date of Patent: Jul. 10, 2018

(54) DIRECT CURRENT (DC) MOTOR FOR FUEL PUMP FOR VEHICLE

(71) Applicant: COAVIS, Sejong-si (KR)

(72) Inventors: Gyu Sang Yu, Chungcheongbuk-do (KR); Hyun Tae Lee, Sejong-si (KR); Wan Sung Pae, Sejong-si (KR)

(73) Assignee: COAVIS, Sejong-si (KR)

( * ) Notice: Subject to any disclaimer, the term of this patent is extended or adjusted under 35 U.S.C. 154(b) by 0 days.

(21) Appl. No.: 15/616,829

(22) Filed: Jun. 7, 2017

(65) Prior Publication Data

US 2018/0102680 A1    Apr. 12, 2018

(30) Foreign Application Priority Data

Oct. 12, 2016 (KR) .................. 10-2016-0131927

(51) Int. Cl.
*H02K 1/17* (2006.01)
*F02M 59/44* (2006.01)
(52) U.S. Cl.
CPC ............... *H02K 1/17* (2013.01); *F02M 59/44* (2013.01)
(58) Field of Classification Search
CPC .................................. H02K 1/17; H02K 1/18
USPC ....................... 310/154.01–154.49
IPC .............................................. H02K 1/17,1/18
See application file for complete search history.

(56) References Cited

U.S. PATENT DOCUMENTS

| | | | | |
|---|---|---|---|---|
| 3,064,150 A | * | 11/1962 | Barnes ................. | H02K 23/04 310/111 |
| 4,896,065 A | * | 1/1990 | Tsuyama ............. | H02K 5/1672 310/154.28 |
| 6,700,250 B2 | * | 3/2004 | Miyasaka ........... | H02K 7/063 310/261.1 |
| 2002/0033648 A1 | * | 3/2002 | Harada ............... | H02K 23/04 310/156.38 |
| 2009/0127958 A1 | * | 5/2009 | Honkura ............. | H02K 1/17 310/154.28 |
| 2010/0033036 A1 | * | 2/2010 | Ortt ..................... | H02K 1/17 310/50 |

(Continued)

FOREIGN PATENT DOCUMENTS

JP    2005105895 A    4/2005
JP    2006063953 A    3/2006

(Continued)

OTHER PUBLICATIONS

Korean Intellectual Property Office, Notice of Allowance Issued in Application No. 10-2016-0131927, dated Feb. 16, 2017, 6 pages. (Submitted with English Language Summary).

*Primary Examiner* — Thomas Truong
(74) *Attorney, Agent, or Firm* — McCoy Russell LLP

(57) ABSTRACT

Provided is a DC motor for a fuel pump for a vehicle. The DC motor for a fuel pump for a vehicle includes: a housing whose inside is hollow; a stator coupled to the inside of the housing and having a first permanent magnet whose N pole is disposed inwardly in a radial direction and a second permanent magnet whose S pole is disposed inwardly in a radial direction, the first permanent magnet and the second permanent magnet being spaced apart from each other to face each other; and a rotor disposed on an inside of the stator while being spaced apart from the stator, in which a first gap g1 between the first permanent magnet and the rotor is different from a second gap g2 between the second permanent magnet and the rotor, whereby a torque ripple that is a fluctuation width of a cogging torque is reduced.

2 Claims, 7 Drawing Sheets

(56) References Cited

U.S. PATENT DOCUMENTS

| | | | | |
|---|---|---|---|---|
| 2011/0116955 A1* | 5/2011 | Naito | ............... | F04D 5/002 |
| | | | | 417/423.7 |
| 2013/0093277 A1* | 4/2013 | Onishi | ............... | H02K 1/17 |
| | | | | 310/154.13 |

FOREIGN PATENT DOCUMENTS

| | | | |
|---|---|---|---|
| JP | 2012227978 A | 11/2012 | |
| JP | 2016036206 A | 3/2016 | |
| KR | 100503721 B1 | 7/2005 | |

* cited by examiner g1 = g2 g1 < g2, t1 = t2

$g1 < g2, \ t1 = t2$

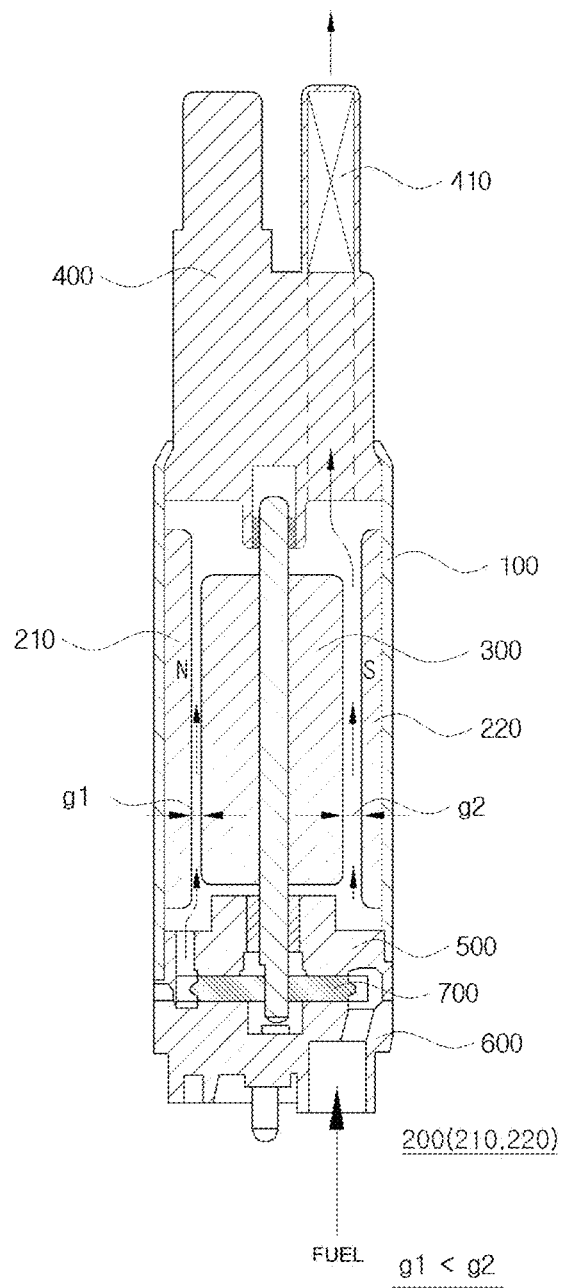

DIRECT CURRENT (DC) MOTOR FOR FUEL PUMP FOR VEHICLE

CROSS-REFERENCE TO RELATED APPLICATIONS

This application claims priority under 35 U.S.C. § 119 to Korean Patent Application No. 10-2016-0131927, filed on Oct. 12, 2016, in the Korean Intellectual Property Office, the disclosure of which is incorporated herein by reference in its entirety for all purposes.

TECHNICAL FIELD

The following disclosure relates to a direct current (DC) motor for a fuel pump for a vehicle, in which a stator is fixedly coupled to an inside of a housing and a rotor is disposed inside the stator and is driven by a DC power source to rotate.

BACKGROUND

Generally, a vehicle is provided with a fuel pump submerged in fuel in a fuel tank so that the fuel in the fuel tank may be pressure-fed to be fed to an engine side, and a fuel pump for the vehicle is integrally coupled to a DC motor to drive an impeller provided in the fuel pump.

As illustrated in FIG. 1, a stator 20 formed of a permanent magnet is fixedly coupled to an inner circumferential surface of the housing 10 and has a first permanent magnet 21 and a second permanent magnet 22 that are disposed to face each other, in which an N pole of the first permanent magnet 21 is disposed inwardly in a radial direction and an S pole of the second permanent magnet 22 is disposed inwardly in a radial direction. At this point, the stator 20 and the rotor 30 are spaced apart from each other, and a first gap g1 between the first permanent magnet 21 and the rotor 30 is equal to a second gap g2 between the second permanent magnet 22 and the rotor 30.

By the way, the DC motor for a fuel pump for a vehicle has different magnitudes of magneto-resistance (enough magnitude to obstruct a flow of magnetic flux) depending on rotated positions of the rotor when the rotor is rotated, and the magneto-resistance causes a pulsation of a motor torque. The pulsating phenomenon of the torque is called a cogging torque, and the motor has a vibration source for vibration and noise due to the pulsation of the torque. Further, the first gap g1 between the first permanent magnet 21 and the rotor 30 is equal to the second gap g2 between the second permanent magnet 22 and the rotor 30, and therefore, a torque ripple which is a fluctuation width of the cogging torque due to the rotation of the rotor becomes large.

Consequently, since vibration and noise occurrence in the fuel pump driven by the motor may be caused, there is a need to improve the noise and vibration characteristics of the motor by reducing the torque ripple of the motor.

RELATED ART DOCUMENT

Patent Document

KR 10-0503721 B1 (2005.07.18.)

SUMMARY

An embodiment of the present disclosure is directed to providing a DC motor for a fuel pump for a vehicle, in which a permanent magnet having an N pole and a permanent magnet having an S pole are asymmetrical with each other so that a gap between the N-pole permanent magnet configuring a stator and a rotor is different from a gap between the S-pole permanent magnet configuring the stator and the rotor to reduce a torque ripple, thereby reducing noise and vibration of the motor.

In one general aspect, a DC motor for a fuel pump for a vehicle includes: a housing whose inside is hollow; a stator coupled to the inside of the housing and having a first permanent magnet whose N pole is disposed inwardly in a radial direction and a second permanent magnet whose S pole is disposed inwardly in a radial direction, the first permanent magnet and the second permanent magnet being spaced apart from each other to face each other; and a rotor disposed on an inside of the stator while being spaced apart from the stator, in which a first gap g1 between the first permanent magnet and the rotor may be different from a second gap g2 between the second permanent magnet and the rotor.

A thickness t1 of the first permanent magnet may be different from a thickness t2 of the second permanent magnet.

A thickness t1 of the first permanent magnet may be equal to a thickness t2 of the second permanent magnet, and an insert may be interposed between the housing and the first permanent magnet or between the housing and the second permanent magnet.

An inner circumferential surface of the housing may be provided with a recessed seat groove, a thickness t1 of the first permanent magnet may be equal to a thickness t2 of the second permanent magnet, and a portion of the first permanent magnet or the second permanent magnet may be inserted into the seat groove to be coupled thereto.

A thickness t1 of the first permanent magnet may be equal to a thickness t2 of the second permanent magnet and a center of the housing and a center of the rotor may be spaced apart from each other.

One end or both ends of the permanent magnet having the larger gap of the first gap g1 between the first permanent magnet and the rotor and the second gap g2 between the second permanent magnet and the rotor may have a rounded curved shape.

Other features and aspects will be apparent from the following detailed description, the drawings, and the claims.

BRIEF DESCRIPTION OF THE DRAWINGS

FIG. 7 is a schematic front cross-sectional view showing a fuel pump for a vehicle including the DC motor for a fuel pump for a vehicle according to the present disclosure.

| DETAILED DESCRIPTION OF MAIN ELEMENTS | |
|---|---|
| 100: Housing | 110: Seat groove |
| 200: Stator | 210: First permanent magnet |
| 211: Insert | 220: Second permanent magnet |
| 300: Rotor | 310: Teeth |
| 320: Pole shoe | 330: Coil |
| 400: Upper cover | 410: Check valve |
| 500: Upper casing | |
| 600: Lower casing | |
| 700: Impeller | |
| t1: Thickness of first permanent magnet | |

DETAILED DESCRIPTION OF EMBODIMENTS

Hereinafter, a DC motor for a fuel pump for a vehicle according to an exemplary embodiment of the present disclosure as described above will be described in detail with reference to the accompanying drawings.

Figure 1:
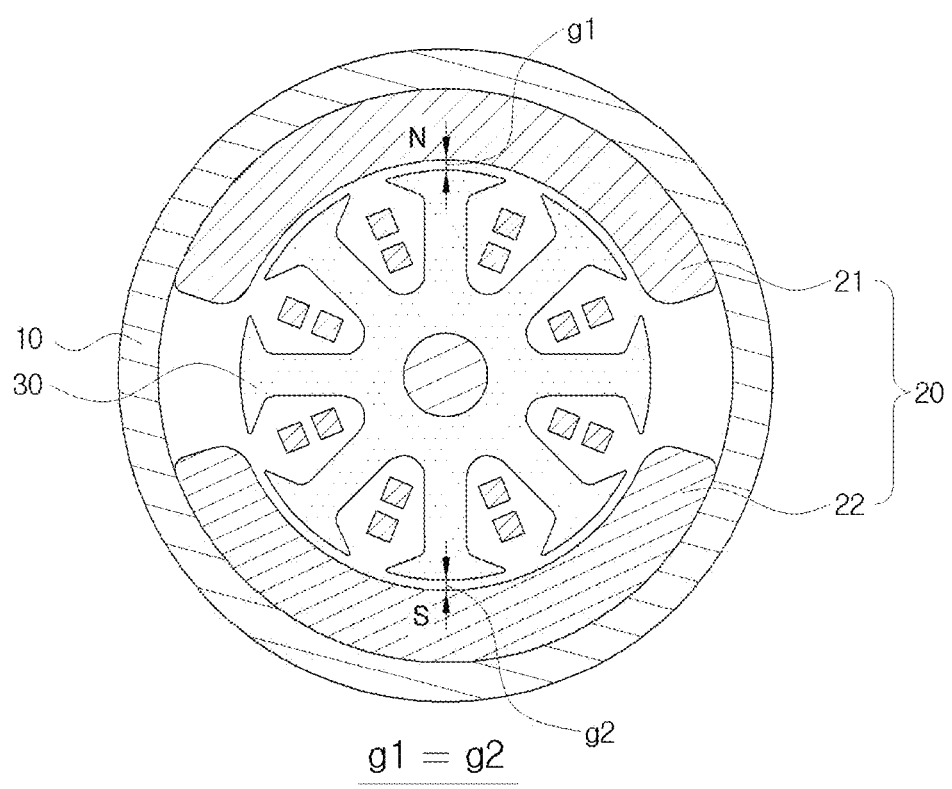
FIG. 1 is a schematic cross-sectional view showing the existing DC motor for a fuel pump for a vehicle.
Figure 2:
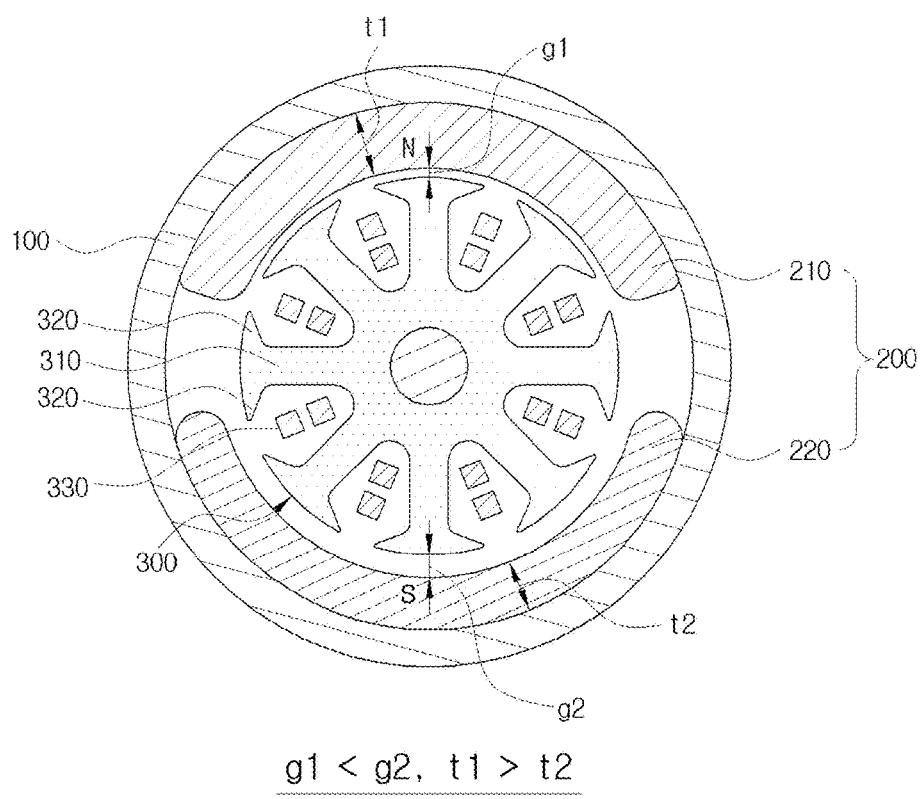
FIG. 2 is a schematic cross-sectional view of a DC motor for a fuel pump for a vehicle according to a first exemplary embodiment of the present disclosure.

FIG. 2 is a schematic cross-sectional view of a DC motor for a fuel pump for a vehicle according to a first exemplary embodiment of the present disclosure.

As shown, the DC motor for a fuel pump for a vehicle according to an exemplary embodiment of the present disclosure includes: a housing 100 whose inside is hollow; a stator 200 coupled to an inside of the housing 100 and having a first permanent magnet 210 whose N pole is disposed inwardly in a radial direction and a second permanent magnet 220 whose S pole is disposed inwardly in a radial direction, the first permanent magnet 210 and the second permanent magnet 220 being spaced apart from each other to face each other; and a rotor 300 disposed on an inside of the stator 200 while being spaced apart from the stator 200, wherein a first gap g1 between the first permanent magnet 210 and the rotor 300 may be different from a second gap g2 between the second permanent magnet 220 and the rotor 300.

The housing 100 is a part forming an appearance. For example, the housing 100 may have a cylindrical shape and thus an inside thereof may be hollow and may have a tube shape whose upper end and lower end are open to communicate with the hollowed inside. Thus, a cross section cut in a direction perpendicular to a center axis of the cylindrical housing 100 may be circular, and outer and inner circumferential surfaces of the housing 100 may be circular.

The stator 200 is a part fixedly coupled to an inner circumferential surface that is the inside of the housing 100 and is configured of the first permanent magnet 210 forming the N pole and the second permanent magnet 220 forming the S pole so that the first permanent magnet 210 whose N pole is disposed inwardly in a radial direction and the second permanent magnet 220 whose S pole is disposed inwardly in a radial direction may be spaced apart from each other to face each other. That is, as illustrated, the first permanent magnet 210 and the second permanent magnet 220 may each be formed separately and may be fixedly coupled to the inner circumferential surface of the housing 100. For example, the first permanent magnet 210 and the second permanent magnet 220 may be disposed to face each other and may be disposed at opposite positions with respect to a center of the housing 100 to be symmetrical with each other. Further, the first permanent magnet 210 and the second permanent magnet 220 may be formed so that both ends thereof are spaced apart from each other. Further, the portions forming the outer circumferential surfaces of each of the first permanent magnet 210 and the second permanent magnet 220 have an arc shape and a radius of the first permanent magnet 210 and the second permanent magnet 220 is equal to a radius of an inner circumferential surface of the housing 100, such that the outer circumferential surfaces of the first permanent magnet 210 and the second permanent magnet 220 may adhere to the inner circumferential surface of the housing 100. Further, the portions forming the inner circumferential surfaces of each of the first permanent magnet 210 and the second permanent magnet 220 may also have an arc shape. Further, the first permanent magnet 210 and the second permanent magnet 220 may be fixedly coupled to the housing 100 by various structures and methods.

The rotor 300 may be disposed at the inside of the stator 200 configured of the first permanent magnet 210 and the second permanent magnet 220 to be spaced apart from the stator 200. That is, the outer circumferential surface of the rotor 300 and the inner circumferential surfaces of the first permanent magnet 210 and the second permanent magnet 220 may be spaced apart from each other to form a specific gap. At this time, a rotation center of the rotor 300 may be formed to coincide with the center of the housing 100 or the stator 200. At this time, the rotor 300 may be provided with a plurality of teeth 310 radially extending outwardly in a radial direction from a core part surrounding a rotation axis, and may be provided with Pole shoes 320 extending toward both sides in a circumferential direction from outer ends of the respective teeth 310 extending in a radial direction, such that the outside in the radial direction formed by the plurality of teeth 310 and the Pole shoes 320 may form the outer circumferential surface. At this time, the adjacent Pole shoes 320 may be spaced apart from each other by a specific distance. Further, a coil 330 may be wound around the respective teeth 310. Therefore, the rotor 300 may have the number of poles as many as the number of teeth 310 or the number of spaces formed between the teeth 310.

Here, if a gap between the first permanent magnet 210 and the rotor 300 that is the distance between the inner circumferential surface of the first permanent magnet 210 and the outer circumferential surface of the rotor 300 is referred to as a first gap g1, and a gap between the second permanent magnet 220 and the rotor 300 that is the distance between the inner circumferential surface of the second permanent magnet 220 and the outer circumferential surface of the rotor 300 is referred to as a second gap g2, the first gap g1 and the second gap g2 may be different from each other. That is, as shown, the first permanent magnet 210 and the second permanent magnet 220 are vertically asymmetrical with each other when viewed based on a horizontal line passing through the center of the housing 100 or the rotation center of the rotor 300. For example, the first gap g1 may be larger than the second gap g2.

Figure 3:
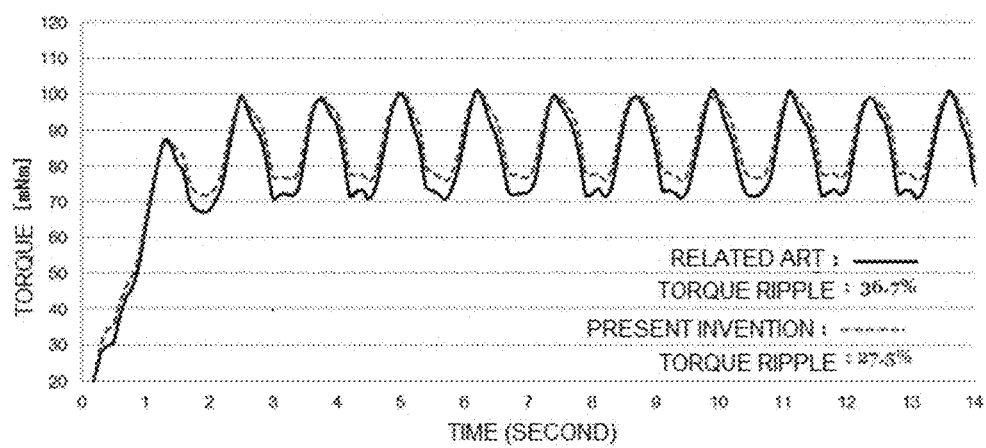
FIG. 3 is a graph and a table showing a torque ripple measured by simulating a DC motor for a fuel pump for a vehicle according to the present disclosure.

Therefore, if vibration is analyzed when power is applied to rotate the rotor, the vibration relatively greatly appears at an order (8 order) corresponding to a least common multiple of the number (two) of permanent magnets of the stator and the number (eight) of poles of the rotor. According to the exemplary embodiment of the present disclosure, the cogging torque formed between the first permanent magnet and the rotor and the cogging torque formed between the second permanent magnet and the rotor have different sizes, and thus the effect of dispersing the influence of the cogging torque may be obtained, such that it may be appreciated that the torque ripple which is the fluctuation width of the cogging torque is reduced as the simulation result as shown in FIG. 3. As described above, the present disclosure has an advantage that the torque ripple which is the fluctuation width of the cogging torque is reduced and thus the noise and vibration of the DC motor may be reduced.

First Exemplary Embodiment

Further, in the DC motor for a fuel pump for a vehicle according to the present disclosure, a thickness t1 of the first permanent magnet 210 and a thickness t2 of the second permanent magnet 220 may be different from each other.

That is, as illustrated in FIG. 2, the thickness t2 of the second permanent magnet 220 is thinner than the thickness t1 of the first permanent magnet 210, such that the second gap g2 may be larger than the first gap g1. Thus, the second gap g2 is formed to be different from the first gap g1 by the simple structure in which the thickness of the second permanent magnet 220 is thinner than that of the first permanent magnet 210, thereby reducing the torque ripple. At this time, contrary to the foregoing description, the thickness of the first permanent magnet 210 may be thinner than that of the second permanent magnet 220. At this point, the cross section of the housing 100 may have a cylindrical shape, the first permanent magnet 210 and the second permanent magnet 220 may have an arc shape, and the rotor 300 may be formed like the foregoing example.

Second Exemplary Embodiment

Further, the DC motor for a fuel pump for a vehicle according to the exemplary embodiment of the present disclosure, the thickness t1 of the first permanent magnet 210 is equal to the thickness t2 of the second permanent magnet 220, and an insert 211 may be interposed between the housing 100 and the first permanent magnet 210 or between the housing 100 and the second permanent magnet 220.

Figure 4:
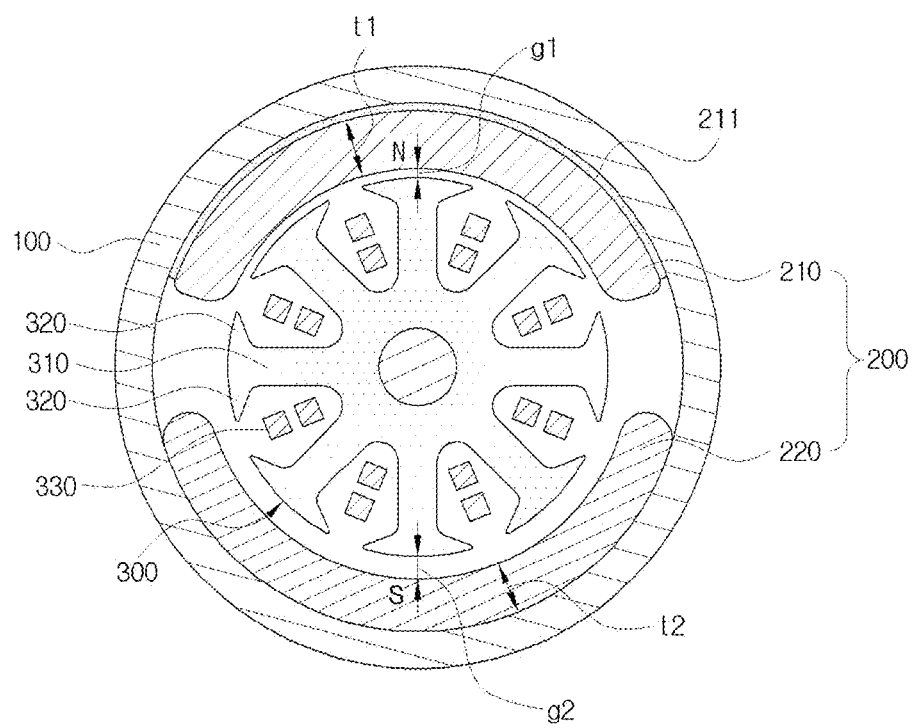
FIGS. 4 to 6 are schematic cross-sectional views showing a DC motor for a fuel pump for a vehicle according to second to fourth exemplary embodiments of the present disclosure.

That is, as shown in FIG. 4, the thickness t1 of the first permanent magnet 210 is equal to the thickness t2 of the second permanent magnet 220, but a plate-like insert 211 having a small thickness may be coupled to the housing to adhere to the inner circumferential surface of the housing 100, the first permanent magnet 210 may be coupled to the insert 211 to adhere to the inside of the insert 211 in a radial direction, and the second permanent magnet 220 may be directly coupled to the housing 100 to adhere to the inner circumferential surface of the housing 100, such that the second gap g2 may be larger than the first gap g1. Alternatively, contrary to the foregoing description, the insert is interposed between the housing 100 and the second permanent magnet 220 so that the housing 100 and the second permanent magnet 220 adhere to each other and the first permanent magnet 210 is coupled to the inner circumferential surface of the housing 100, such that the first gap g1 may be different from the second gap g2. At this point, the cross section of the housing 100 may have a cylindrical shape, the first permanent magnet 210 and the second permanent magnet 220 may have an arc shape, and the rotor 300 may be formed like the foregoing example. In addition, the insert 211 may be fixedly coupled to the housing 100 by various structures and methods. Further, the insert 211 may have a separate plate shape and be coupled to the housing 100. The insert may be formed in a form of a coating layer on the inner circumferential surface of the housing 100 so that the housing and the insert may be integrally formed.

Third Exemplary Embodiment

Further, in the DC motor for a fuel pump for a vehicle according to the exemplary embodiment of the present disclosure, the inner circumferential surface of the housing 100 may be provided with a recessed seat groove 110, the thickness t1 of the first permanent magnet 210 may be equal to the thickness t2 of the second permanent magnet 220, and a portion of the first permanent magnet 210 or the second permanent magnet 220 may be inserted into the seat groove 110 to be coupled thereto.

Figure 5:
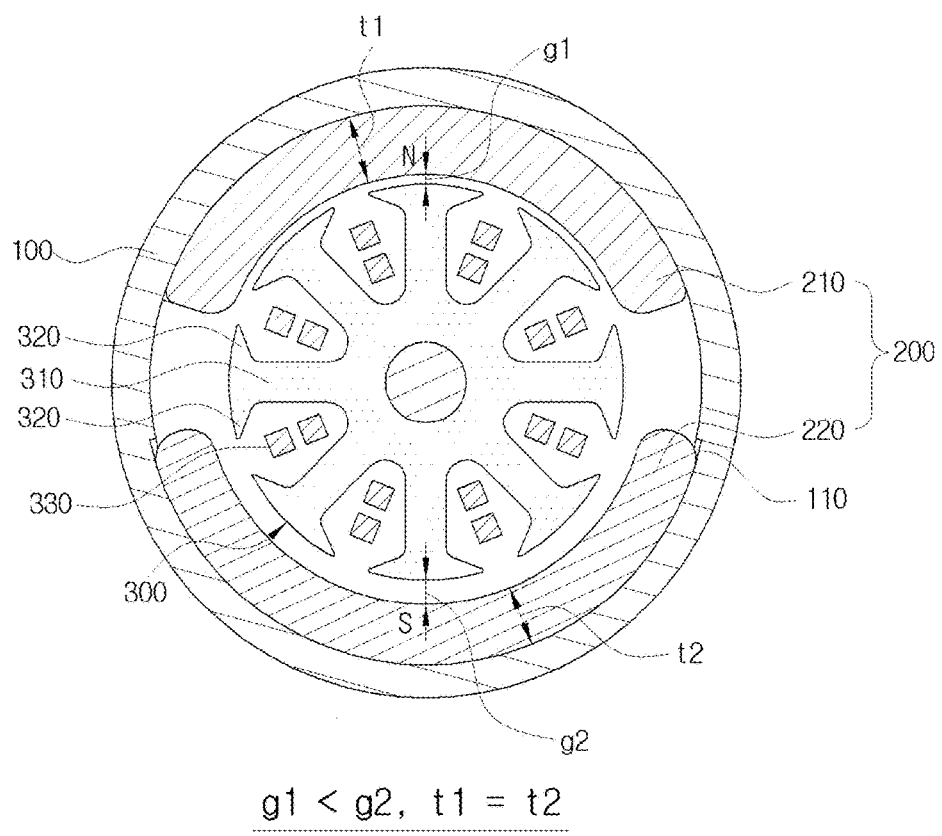

That is, as shown in FIG. 5, the seat groove 110 is formed to be recessed outwardly in a radial direction from the inner circumferential surface of the housing 100 and thus an outside portion that is a portion of the second permanent magnet 220 may be coupled to the seat groove by being inserted and seated into the seat groove, and the first permanent magnet 210 may be directly coupled to the housing to adhere to the inner circumferential surface of the housing 100, such that the second gap g2 may be larger than the first gap g1. Here, the seat groove 110 formed in the housing 100 may be formed by various methods and in various shapes.

At this time, contrary to the foregoing description, the housing 100 to which the first permanent magnet 210 is coupled may be provided with the seat groove, and thus the first permanent magnet may be inserted into and coupled to the seat groove. At this point, the cross section of the housing 100 may have a cylindrical shape, the first permanent magnet 210 and the second permanent magnet 220 may have an arc shape, and the rotor 300 may be formed like the foregoing example.

Fourth Exemplary Embodiment

Further, in the DC motor for a fuel pump for a vehicle according to the present disclosure, the thickness t1 of the first permanent magnet 210 is equal to the thickness t2 of the second permanent magnet 220 and the center of the housing 100 and the center of the rotor 300 may be disposed to be spaced apart from each other.

Figure 6:
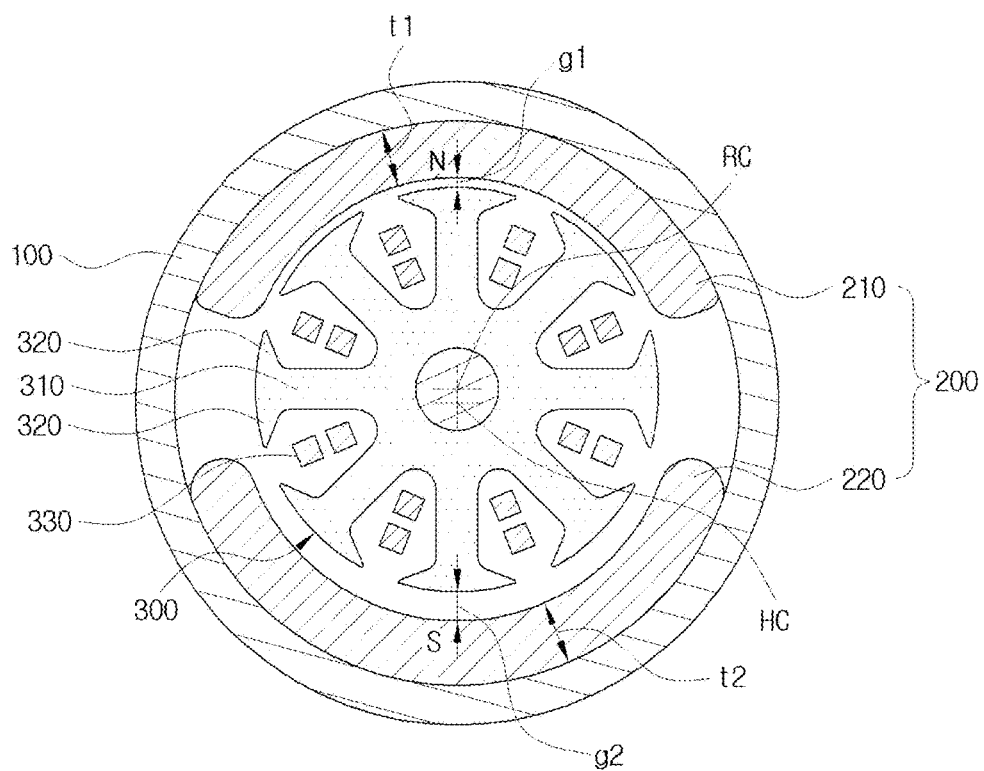

That is, as shown in FIG. 6, the cross section of the housing 100 has a cylindrical shape and thus the inner circumferential surface of the housing 100 has a circular shape, and in the state in which the thicknesses of the first permanent magnet 210 is equal to that of the second permanent magnet 220, the rotation center of the rotor 300 whose outer circumferential surface has a circular shape is disposed to be spaced apart from the center of the housing 100 or the stator 200, such that the second gap g2 may be larger than the first gap g1. At this point, to the contrary, the first gap g1 may be larger than the second gap g2, the first permanent magnet 210 and the second permanent magnet 220 may have an arc shape, and the rotor 300 may be formed like the foregoing example.

Further, one end or both ends of the permanent magnet having the larger gap of the first gap g1 between the first permanent magnet 210 and the rotor 300 and the second gap g2 between the second permanent magnet 220 and the rotor 300 may have a rounded curved shape.

That is, if the second gap g2 is larger than the first gap g1 as shown, one end or both ends of the second permanent magnet 220 may be rounded in the circumferential direction. In this case, the rounded shape may be a curved shape in which a resistance is small when a fluid flows, like a front side of a streamlined shape.

Further, in the DC motor for a fuel pump for a vehicle according to the present disclosure, as shown in FIG. 7, an upper casing 500 and a lower casing 600 disposed at the lower side of the stator 200 and the rotor 300 are coupled to the lower end of the housing 100, and an inside space formed by the coupling of the upper casing 500 to the lower casing 600 is provided with an impeller 700 that may be coupled to a rotating shaft of the rotor 300 to rotate with the rotor 300. Further, an upper end of the housing 100 is coupled to an upper cover 400 that may be provided with a check valve 410. In addition, a lower portion of the rotating shaft of the rotor 300 may be supported by the upper casing 500 and the lower casing 600 and an upper portion of the rotating shaft may be supported by the upper cover 400. In addition, the fuel sucked through an inlet formed in the lower casing 600 is pressurized by the rotating impeller 700 and is discharged into the housing 100 through an outlet formed in the upper casing 500. Thereafter, the fuel flows up while passing between the stator 200 and the rotor 300 and between the housing 100 and the rotor 300 and is pressure-fed to the outside of the fuel pump via the check valve 410 formed on the upper cover 400.

Therefore, in the DC motor for a fuel pump for a vehicle of the present disclosure, the liquid fuel pressurized by and discharged from the pump side passes through the space between the stator and the rotor of the motor and between the housing and the rotor, the fuel discharged from the pump side passes between the stator and the rotor while rotating by the rotation of the rotor, such that the fuel may easily flow through the second gap g2 having a larger gap, thereby reducing the pressure drop, and the end portion in the circumferential direction of the second permanent magnet has a rounded shape, such that a flow resistance of a rotary flux generated while the rotor rotates may be reduced.

According to the exemplary embodiment of the present disclosure, the DC motor for a fuel pump for a vehicle may reduce the noise and vibration of the DC motor as the torque ripple which is the fluctuation width of the cogging torque is reduced.

The present disclosure is not limited to the above-mentioned exemplary embodiments but may be variously applied, and may be variously modified by those skilled in the art to which the present disclosure pertains without departing from the gist of the present disclosure claimed in the claims.

What is claimed is:

1. A DC motor for a fuel pump for a vehicle, comprising:
a cylindrical housing whose inside is hollow;
a stator disposed inside of the housing and having a first permanent magnet whose N pole is disposed inwardly in a radial direction and a second permanent magnet whose S pole is disposed inwardly in a radial direction, the first permanent magnet and the second permanent magnet having an arc shape and being spaced apart from each other to face each other; and
a rotor disposed inside of the stator while being spaced apart from the stator,
wherein a thickness t1 of the first permanent magnet is equal to a thickness t2 of the second permanent magnet, and an insert is interposed between the housing and the first permanent magnet or between the housing and the second permanent magnet,
wherein a first gap g1 between the first permanent magnet and the rotor is different from a second gap g2 between the second permanent magnet and the rotor, and
wherein the insert is formed in a form of an arc-shaped plate to be coupled and adhere to an inner circumferential surface of the housing, and any one of the first permanent magnet and the second permanent magnet is coupled and adheres to an inside of the insert in the radial direction and the other one is coupled and adheres directly to the inner circumferential surface of the housing.

2. The DC motor of claim 1, wherein one end or both ends of the permanent magnet having the larger gap of the first gap g1 between the first permanent magnet and the rotor and the second gap g2 between the second permanent magnet and the rotor have a rounded curved shape.

* * * * *